(12) United States Patent
Bates et al.

(10) Patent No.: US 7,769,817 B2
(45) Date of Patent: *Aug. 3, 2010

(54) ASSISTING THE RESPONSE TO AN ELECTRONIC MAIL MESSAGE

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/178,003

(22) Filed: Jul. 23, 2008

(65) Prior Publication Data

US 2008/0281934 A1    Nov. 13, 2008

Related U.S. Application Data

(63) Continuation of application No. 09/569,278, filed on May 11, 2000, now Pat. No. 7,430,582.

(51) Int. Cl.
*G06F 15/16* (2006.01)

(52) U.S. Cl. ...................... 709/207; 709/206

(58) Field of Classification Search ........................ None
See application file for complete search history.

(56) References Cited

U.S. PATENT DOCUMENTS

| | | | | |
|---|---|---|---|---|
| 5,694,616 A | * | 12/1997 | Johnson et al. | 709/207 |
| 5,826,022 A | * | 10/1998 | Nielsen | 709/206 |
| 5,905,863 A | * | 5/1999 | Knowles et al. | 709/206 |
| 6,009,462 A | * | 12/1999 | Birrell et al. | 709/206 |
| 6,057,841 A | * | 5/2000 | Thurlow et al. | 715/809 |
| 6,279,010 B1 | * | 8/2001 | Anderson | 1/1 |
| 6,400,810 B1 | * | 6/2002 | Skladman et al. | 379/93.24 |
| 6,496,853 B1 | * | 12/2002 | Klein | 709/206 |
| 6,546,390 B1 | * | 4/2003 | Pollack et al. | 1/1 |
| 7,430,582 B1 | * | 9/2008 | Bates et al. | 709/207 |

OTHER PUBLICATIONS

Microsoft Outlook 2000 Minimum Requirements, Dec. 29, 1999. Microsoft via http://www.archive.org. p. 1-2.
Thomas Rizzo, Microsoft Outlook 2000: Office's Killer App Just Keeps Getting Better. Nov. 1998. Microsoft. p. 1-8.
John R. Nicholson et al. Teach Yourself Outlook 98 in 24 Hours. 1998. Macmillan Computer Publishing. p. 139-152; 173-193.

* cited by examiner

*Primary Examiner*—Christian LaForgia
(74) *Attorney, Agent, or Firm*—Patterson & Sheridan, LLP

(57) ABSTRACT

A method, article of manufacture and apparatus for assisting an electronic mail (e-mail) response message by providing e-mail messages related to an open e-mail message. Specifically, the method determines whether an available e-mail message is related to the open e-mail message. Available e-mail messages may include unopened, previously opened, or incoming e-mail messages. As such, the user is warned of all relevant e-mail messages before responding with a reply message or a forward message.

14 Claims, 5 Drawing Sheets

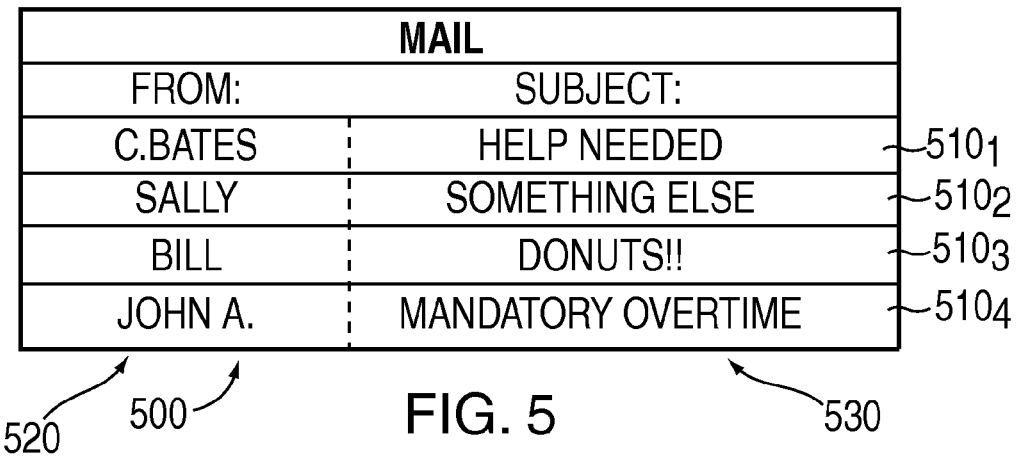
FIG. 5
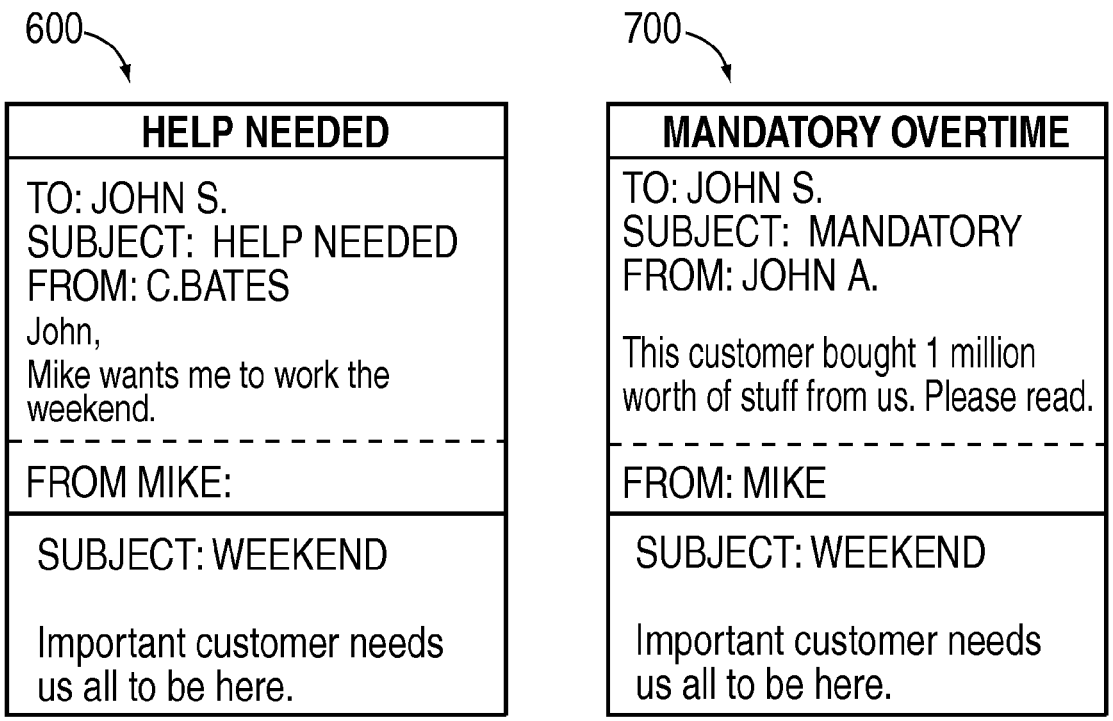
FIG. 6
FIG. 7

ASSISTING THE RESPONSE TO AN ELECTRONIC MAIL MESSAGE

CROSS-REFERENCE TO RELATED APPLICATIONS

This application is a continuation of U.S. patent application Ser. No. 09/569,278, filed May 11, 2000 now U.S. Pat. No. 7,430,582, which is herein incorporated by reference in its entirety.

BACKGROUND OF THE INVENTION

1. Field of the Invention

The invention relates to electronic mail systems and, more particularly, the invention relates to a method, article of manufacture and apparatus for assisting the response to an electronic mail (e-mail) message.

2. Background of the Related Art

In today's electronic mail (e-mail) environment, many people become overloaded with the amount of e-mail that they receive. This often causes problems when a user decides to prepare a reply message or a forward message in response to an open e-mail message. For example, a related e-mail message may arrive while a user is preparing a reply e-mail message or a forward e-mail message. Alternatively, the user may not have considered all related e-mail messages that are unopened, or previously opened. In either case, the user may send the reply e-mail message or forward e-mail message without considering all other available e-mail messages that are related to the open e-mail message.

To address the other related e-mail messages, the user may need to respond to additional e-mail messages. However, the time spent on responding to these additional e-mail messages reduces productivity. The user may read all other e-mail messages before responding to a previously opened or read e-mail message, but this also causes lost time and wasted productivity.

Therefore, a need exists in the art for a method and apparatus to notify or warn the user of all related e-mail messages before that user responds to a previously opened e-mail message.

SUMMARY OF THE INVENTION

The invention provides a method, article of manufacture and apparatus for identifying electronic mail (e-mail) messages related to an open e-mail message such that a user can consider all related e-mail messages before replying to the open e-mail message.

In one embodiment, the invention provides a method for identifying e-mail messages related to an open e-mail message. Specifically, the method determines whether an available e-mail message is related to the open e-mail message. Such available e-mail messages include an unopened e-mail message, a previously opened e-mail message, and incoming, e.g., new, e-mail messages.

In another embodiment, the invention provides a method for responding to an e-mail message. Specifically, the method comprises opening an e-mail message, determining whether an available e-mail message is related to the open e-mail message, displaying a list of the available e-mail messages determined as being related to the open e-mail message, and responding to the open e-mail message in view of the displayed list.

The invention also provides an apparatus having a memory, and a processing unit. The memory stores an open e-mail message, available e-mail messages and a program. The processing unit, coupled to the memory, executes the program to determine whether an available e-mail message is related to the open e-mail message.

Additionally, a computer readable medium storing a software program is provided, where the software program, when executed by a computer, causes the computer to perform a method. In one embodiment of the computer readable medium, the method determines whether an available e-mail message is related to an open e-mail message. In another embodiment of the computer readable medium, the method opens an e-mail message, determines whether an available e-mail message is related to the open e-mail message, displays a list of the available e-mail messages determined as being related to the open e-mail message, and responds to the open e-mail message in view of the displayed list. The available e-mail messages include unopened, previously opened, and incoming e-mail messages.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 depicts a list of e-mail messages displayed on a terminal;

FIG. 6 depicts a view of the first e-mail message on the list of FIG. 5; and

FIG. 7 depicts a view of an e-mail message related to the e-mail message of FIG. 6.

To facilitate understanding, identical reference numerals have been used, where possible, to designate identical elements that are common to the figures.

DETAILED DESCRIPTION OF THE PREFERRED EMBODIMENT

Figure 1:
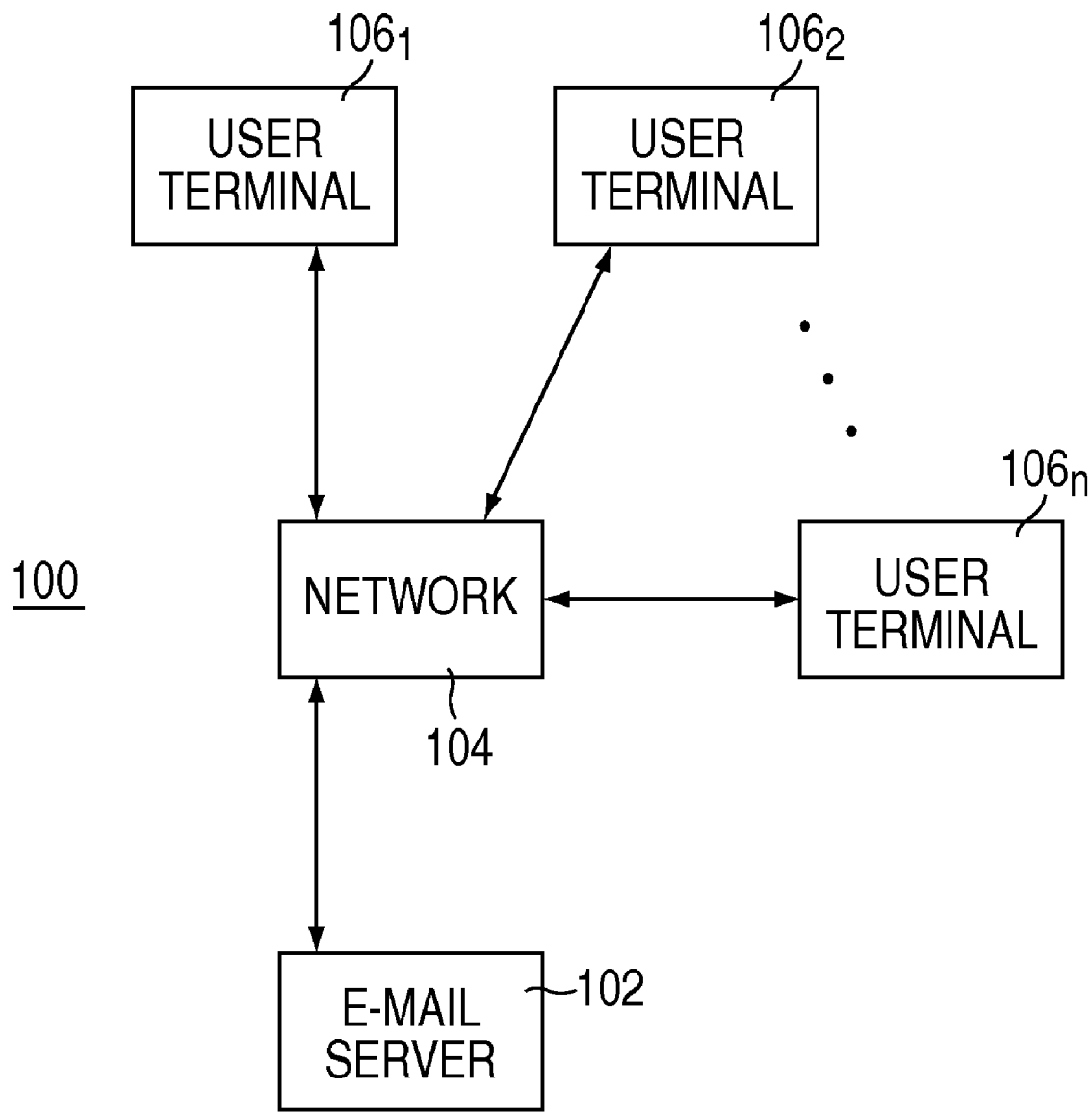
FIG. 1 depicts a simplified block diagram of an electronic mail (e-mail) system that benefits from the present invention.

FIG. 1 depicts an electronic mail (e-mail) system 100 that benefits by use of the present invention. The present invention is embodied as an executable software routine(s) that generally resides within the user terminals 106. The system 100 comprises an e-mail server 102, a network 104 and a plurality of user terminals $106_1, 106_2, \ldots 106_n$. Each user terminal may be a computer system, an e-mail enabled network appliance, an e-mail enabled wireless device and the like. The user terminals 106 are connected to one another through the network 104 and also connected through the network 104 to the e-mail server 102. The e-mail server 102 provides e-mail services to all of the user terminals 106 such that e-mail addressed from one terminal to another is routed through the network 104 to the e-mail server. The e-mail server 102 then properly addresses the e-mail to an appropriate user terminal 106. Although the system is shown having a hub and spoke configuration, other forms of networks may also benefit from the invention.

In addition to conventional e-mail messages, the system 100 may optionally route control messages to the user terminals 106. In one embodiment of the invention, the user terminal 106 processes the control message associated with an open e-mail message and an available e-mail message, e.g., unopened, previously opened, or incoming e-mail messages, to determine whether the available and opened e-mail messages are related. Note that unopened e-mail messages include unread e-mail messages. In one embodiment, the available and opened e-mail messages are related if the associated control messages are substantially the same. In some embodiment, the control messages are handled and routed by the system 100 in substantially the same manner as conventional e-mail.

Figure 2:
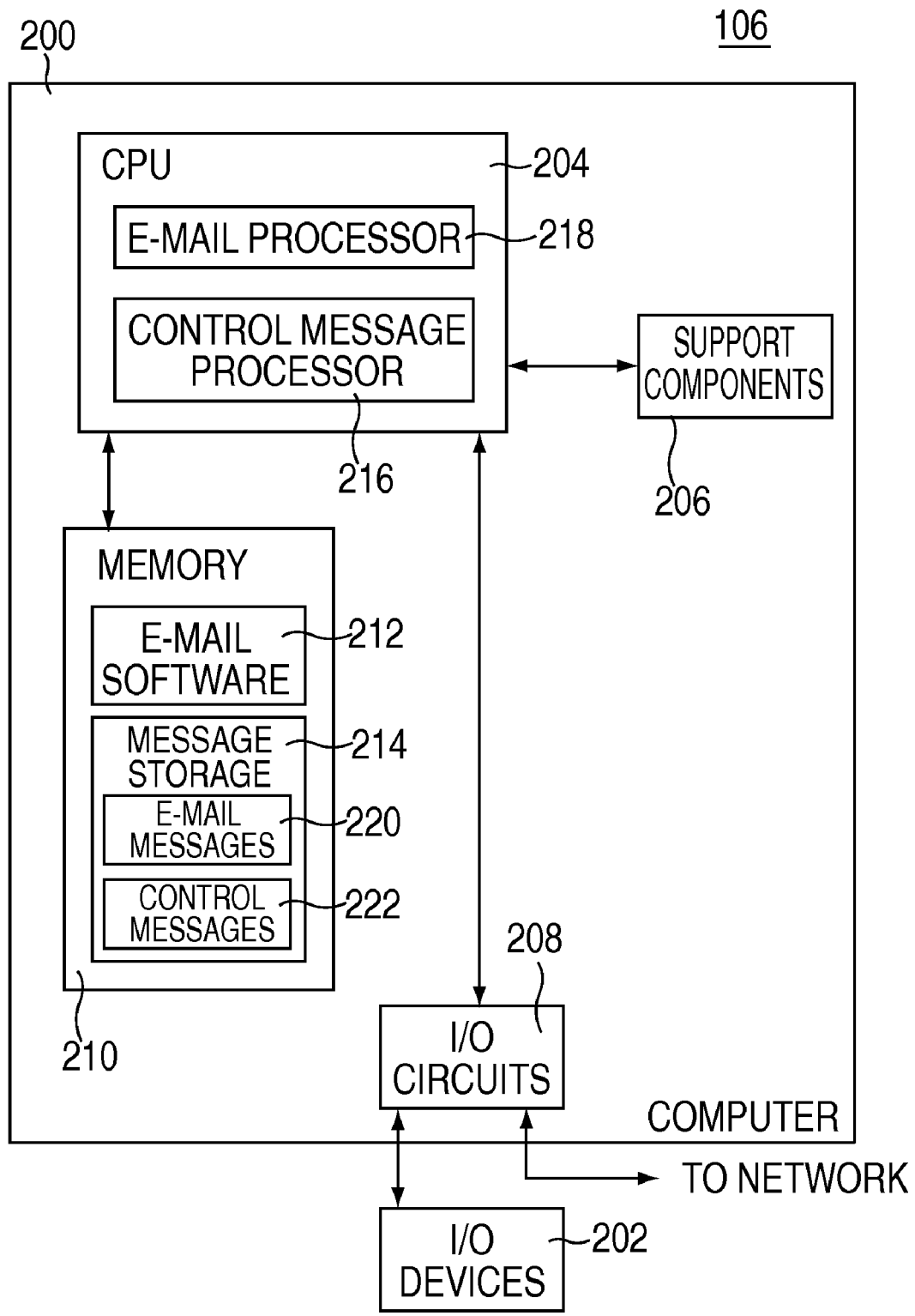
FIG. 2 depicts a simplified block diagram of a user terminal (computer) within the electronic mail system of FIG. 1.

FIG. 2 depicts a user terminal 106, e.g., a general purpose computer system. User terminal 106 comprises a computer 200 and an input/output device or devices 202 such as a monitor, a keyboard, a mouse, a trackball and the like. The computer 200 comprises a central processing unit 204, support components 206, input/output circuits 208 and a memory 210. The memory 210 may be a solid state memory, a disc drive, an optical memory, a removable memory device, or a combination of any of these memory devices. The input/output circuits 208 provide a well-known interface from the CPU 204 to the I/O devices 202. The support components 206 are well known in the art and include such circuits as cache, power supplies, clock circuits, and the like. The combination of all of these circuits, components and elements forms a general purpose computer that, when executing a particular software package or routine, becomes a specific purpose computer. In this case, the CPU 204, when executing the electronic mail processing software 212 of the present invention, operates as an e-mail processor 218 as well as a control message processor 216. The e-mail software 212 resides in memory 210. In addition, the electronic mail (e-mail) messages 220 including any associated control messages 222 are stored in a message storage 214 within the memory 210. In addition, the I/O circuits 208 generally contain a network interface card or modem that couples the computer to the network of FIG. 1 such that e-mail messages can be routed to and from the computer 200.

As will be described in detail below, one embodiment of the invention is implemented as a program product for use with a computer system such as, for example, the system 100 shown in FIG. 1. The program(s) of the program product defines functions of the preferred embodiment and can be contained on a variety of signal/bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

The invention is embodied in the e-mail processor 218. In one embodiment of the invention, the e-mail processor 218 executes a program, i.e. a search task or a background task, to determine whether at least one available e-mail message, e.g., unopened, previously opened, or incoming e-mail message, is related to an open e-mail message. For example, the e-mail processor 218 may identify an available e-mail message and an open e-mail message as related if the available e-mail message has substantially similar subject lines, or the same or substantially similar text or users as the open e-mail message. Additionally, the e-mail message processor 218 may execute the program to determine whether at least one incoming e-mail message is related to the open e-mail message. After determining whether an available and/or incoming e-mail message is related to the open e-mail message, the e-mail processor 218 notifies the user of the related e-mail messages. Notification may be accomplished via the input/output device 202, e.g., a display device. As such, the invention warns the user to consider all relevant e-mail messages before responding with a reply message or a forward message.

In another embodiment of the invention, the opened and available e-mail messages utilize associated control words having a message identifier. If the control messages are sent separately from the associated e-mail message, the control processor 216 uses the control messages to determine whether the available e-mail message, e.g., unopened, previously opened, or incoming e-mail message, is related to the open e-mail message. For example, the control message processor 216 may determine the available e-mail message as related to the open e-mail message if the available e-mail message has substantially the same message identifier as the opened e-mail message. Alternatively, if the control messages are embedded in the header of the e-mail message, the e-mail processor 218 parses the control messages from the e-mail message to determine whether the associated control messages are related, i.e., substantially the same. The e-mail processor 218 then notifies the user as previously described.

Figure 3:
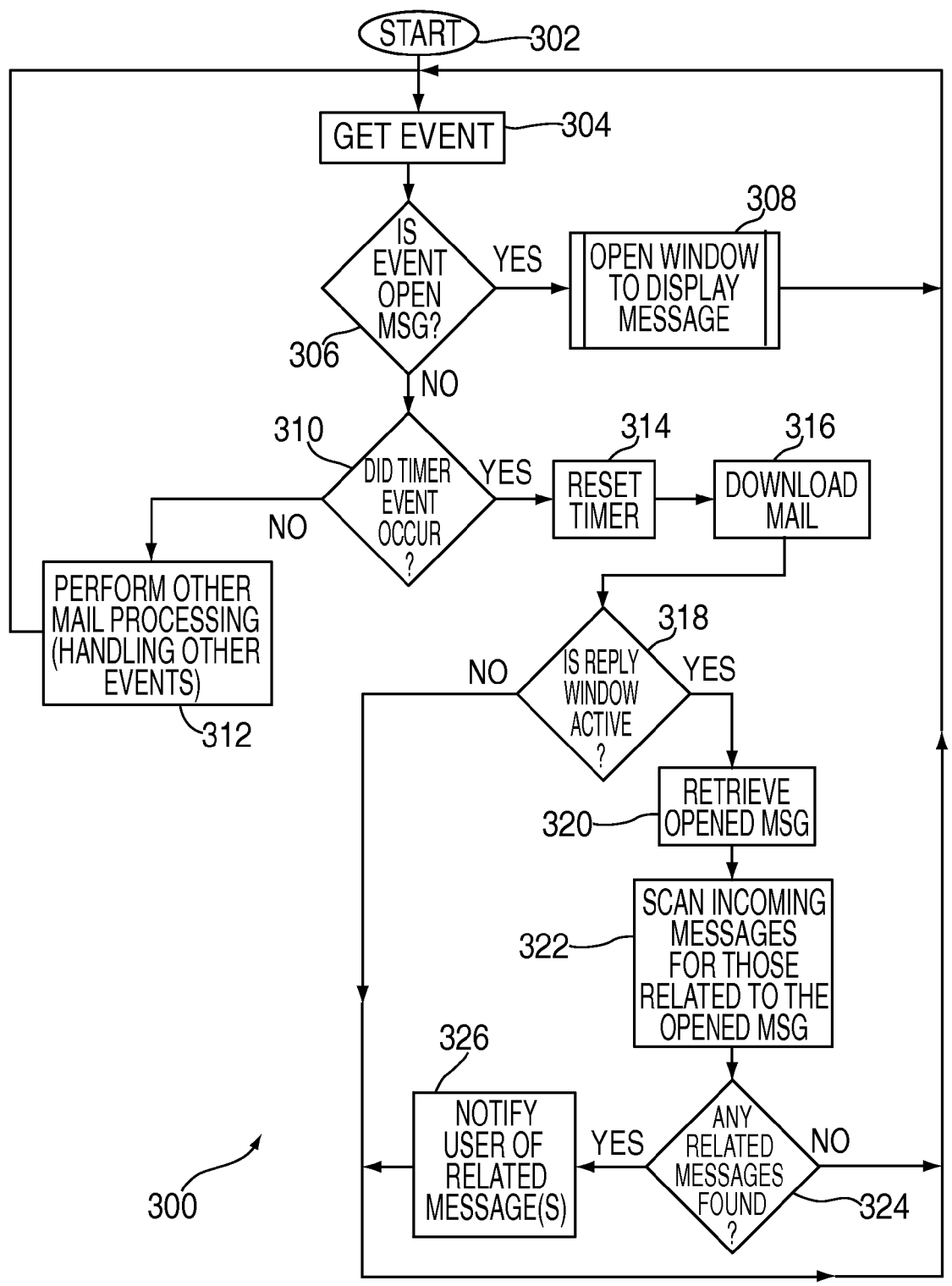
FIG. 3 depicts a flow diagram for implementing a mail program or e-mail response assistant that identifies related e-mail messages in accordance with the present invention.
Figure 4:
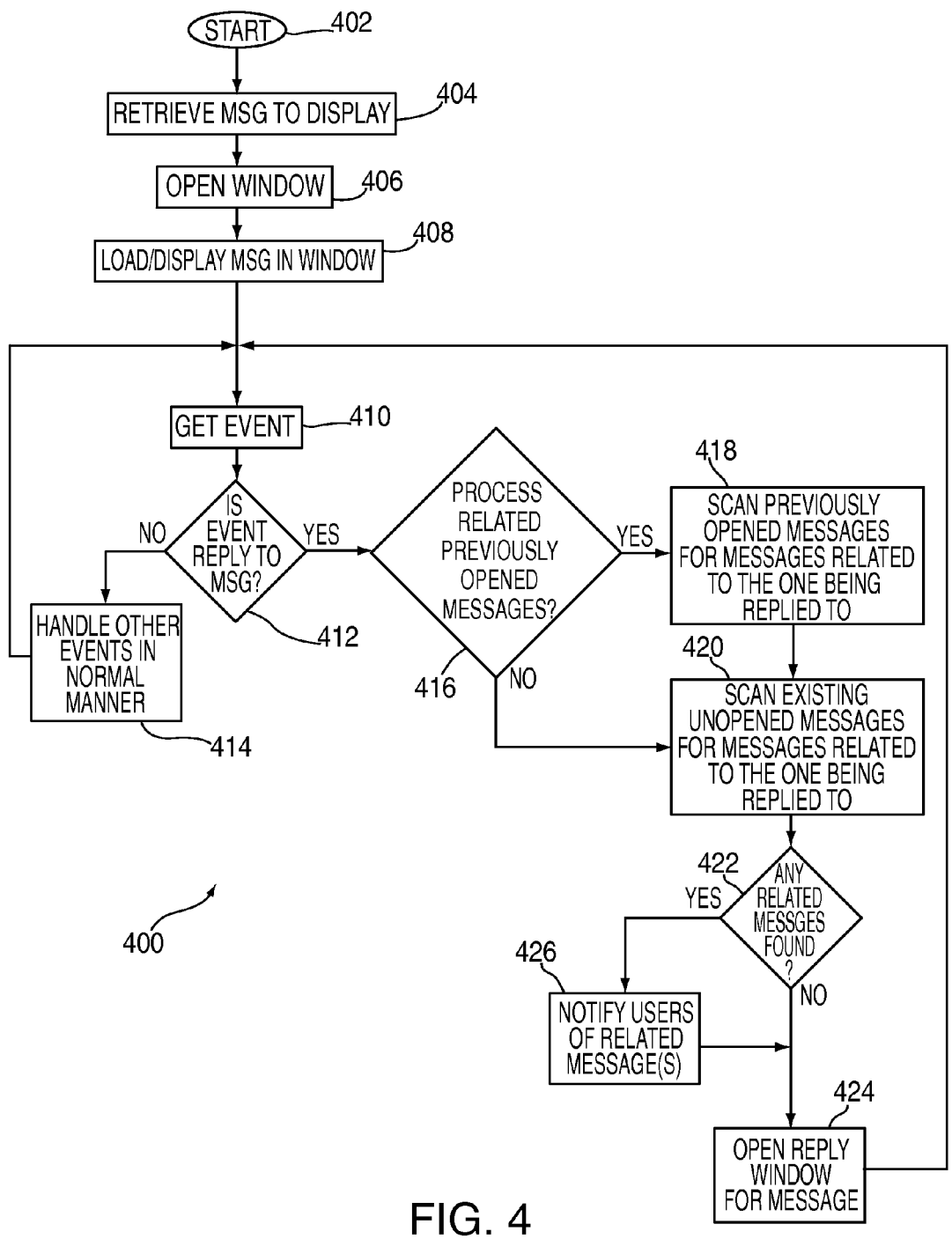
FIG. 4 depicts a flow diagram for implementing the e-mail response assistant while an e-mail message is open.

FIG. 3 depicts a flow diagram of the e-mail program (method 300) implementing the reply feature of the present invention. FIG. 4 depicts a flow diagram of the e-mail program (method 400) that is executed by the e-mail processor 218 upon opening of a received e-mail message. To best understand the invention, the reader should simultaneously refer to FIGS. 3-4.

The method 300 is entered at step 302 and retrieves an event at step 304. Such events may represent a particular command from the recipient or user of an e-mail message. The method 300 operates in an event-driven manner, i.e., the method 300 retrieves events and then performs different steps in response to these events.

At step 306, the method 300 determines whether the event is to open an e-mail message. If an e-mail message is to be opened, the method 300 proceeds to open the e-mail message at step 308. Step 308 is further described with respect to method 400 in FIG. 4. If the e-mail message is not to be opened, then the method 300 proceeds to step 310.

Step 310 queries whether a timer event, i.e., a timer reset, occurs. In one embodiment, the method 300 utilizes a timer that resets in periodic intervals. The timer periodically resets such that the method 300 may download incoming mail at periodic intervals. If the timer event does not occur, then the method 300 proceeds to step 312, where the method 300 processes other events or otherwise perform normal mail processing. After performing step 312, the method 300 proceeds back to retrieve another event in step 304. If the timer event occurs, then the method 300 proceeds to reset the timer at step 314.

The method 300 proceeds to step 316 for downloading any e-mail messages received before the timer event. At step 318, the method 300 queries whether a reply window is active or open. Namely, step 318 determines whether a recipient has decided to send a reply message in response to an opened e-mail message. If the reply window is inactive, then the method 300 proceeds to retrieve the next event at step 304. If the reply window is active, then the method 300 proceeds to step 320, where the method 300 retrieves the opened e-mail message from the message storage 210 to the e-mail processor 218.

The method 300 proceeds to step 322, where the e-mail processor 218 scans for incoming, e.g., new or presently being received, e-mail messages that are related to the opened e-mail message. Step 322 may be incorporated as a search task or background task. In one embodiment, step 322 scans the incoming e-mail messages, and identifies an e-mail message as related if the incoming e-mail message has a substantially similar subject line as the opened e-mail message. Alternatively, step 322 scans the incoming e-mail messages, and identifies the scanned e-mail message as related if the incoming e-mail messages has substantially similar text, senders or recipients as the opened e-mail message. In another embodiment, step 322 scans the incoming e-mail messages and/or control messages provided therewith, and identifies the scanned e-mail messages as related if the incoming e-mail message has substantially the same message identifier as the opened e-mail message. This message identifier is either incorporated within the e-mail message or an optional control message provided with the e-mail message. Other means of identifying related e-mail messages are also contemplated to be within the scope of the invention.

If any incoming e-mail messages are related to the opened e-mail message, the method 300 proceeds to step 326, where the user is notified of each related e-mail message. For example, step 326 may provide a window displaying each related e-mail message with an optional audio signal. After notifying the user in step 326, the method 300 proceeds to retrieve the next event at step 304. If no incoming e-mail messages are related to the opened e-mail message, the method 300 proceeds to retrieve the next event at step 304.

FIG. 4 depicts a flow diagram of a method 400 that embodies step 308 in the mail program. Namely, the method 400 is incorporated within method 300 if an e-mail message is to be opened at step 308. The method 400 starts at step 402 and proceeds to step 404, where the e-mail processor 218 retrieves the open e-mail message from the message storage 214 to the display. The method 400 proceeds to open a window corresponding to the open e-mail message at step 406 and loads or displays the retrieved e-mail message in the display at step 408. The method 400 retrieves an event at step 410.

At step 412, the method 400 queries whether the event is replying to the open e-mail message. Namely, step 412 determines whether the user decided to prepare a reply message in response to the open e-mail message. If there is no reply to the open e-mail message, the method 400 proceeds to step 414, where other events or other processing is handled in a normal manner, while the window or view is open for the e-mail message. After this step 414, the method 400 retrieves the next event at step 410.

If there is a reply to the open e-mail message, the method 400 proceeds to step 416. In step 416, the method 400 queries whether to process previously opened e-mail messages. Namely, step 416 determines whether the user selects an option or feature to search for previously opened, e.g., previously read, e-mail messages that are related to the open e-mail message. If previously opened e-mail messages are not to be processed, the method 400 proceeds to step 420.

In step 420, the method 400 scans for unopened, e.g., unread, e-mail messages that are related to the open e-mail message. Step 420 is similar to step 322, except step 420 scans for unopened messages that are related to the open e-mail message. In one embodiment, step 420 scans a message list, and identifies a message as related if the unopened e-mail message has a substantially similar subject line as the open e-mail message. Alternatively, step 420 scans the unopened messages, and identifies the scanned message as related if the unopened message has substantially the same text, senders or recipients as the opened e-mail message. In another embodiment, step 420 scans the unopened, e.g., unread, e-mail messages and/or control messages provided with the e-mail message, and identifies the scanned e-mail messages as related to the open e-mail message if the unopened message has substantially the same message identifier as the open e-mail message. As with step 322, this message identifier is either incorporated within the e-mail message or an optional control message provided with the e-mail message.

If previously opened e-mail messages are to be processed, the method 400 proceeds to step 418, where the method 400 scans previously opened e-mail messages for messages related to the open e-mail message. Step 418 is similar to steps 322 and 420 except step 418 scans for previously opened, e.g., previously read, e-mail messages in the message storage 214.

After scanning the unopened, e.g., unread, e-mail messages in step 420, the method proceeds to step 422 to determine whether steps 418 and 420 identified any e-mail messages related to the open e-mail message. If none of the scanned e-mail messages are related to the open e-mail message, the method 400 proceeds to step 424, where a reply window is opened for the corresponding open e-mail message. After opening the reply window, the method 400 proceeds to retrieve the next event at step 410. If at least one of the scanned, i.e., unopened or both unopened and previously opened, e-mail messages is related to the open e-mail message, the method 400 proceeds to step 422 to notify the recipient of the related e-mail messages. This notification may occur in substantially the same manner as in step 326. The method 400 proceeds to open the reply window at step 420 and to retrieve the next event at step 410.

Although FIGS. 3-4 are discussed in the context of a reply message in response to a open e-mail message, the invention also applies to forward message in response to the open e-mail message. Moreover, the invention applies to any message provided in response to an e-mail message.

FIG. 5 depicts a list 500 of e-mail messages received at a terminal 106. FIG. 6 depicts a view 600 of an open e-mail message. FIG. 7 depicts a view 700 of an e-mail message that is related to the open e-mail message. To best understand the invention, the reader should simultaneously refer to FIGS. 5-7.

The invention may be implemented as a "smart reply mode" feature of an e-mail program. As an illustrative example, FIG. 5 depicts the message list 500 that lists four messages 510 in a standard manner. Each message is typically represented with sender information 520 and subject information 530. When the user, i.e., John S., decides to open and read the first message $510_1$, the view 600 of FIG. 6 is displayed. In this example, the first message merely suggests that the sender had been asked to work overtime. Had John S. replied to this message without reading any other related messages, his response may have been premised on an erroneous assumption, i.e., having optional overtime.

Under the "smart" reply mode of the invention, the e-mail processor 218 scans for unopened, e.g., unread, and optionally incoming e-mail messages that are related to the open e-mail message. In this case, the e-mail processor 218 notifies the user of any related message, i.e., the fourth message on the mail list. This message is related, since the first-listed e-mail message contains the same component message as the fourth-listed e-mail message. Note that these e-mail messages are related despite having different subject lines. As such, the user probably would not have determined the related e-mail message without reading all other e-mail messages. Also, the fourth-listed e-mail message provides the reason for mandatory overtime, which was not mentioned in the first-listed e-mail message.

With the inventive smart reply feature, the user may properly consider all related e-mail messages before responding with a reply message. This saves time otherwise spent on addressing separate e-mail and improves productivity. As such, the user would not need to open every e-mail message just to identify related e-mail messages.

Although various embodiments which incorporate the teachings of the present invention have been shown and described in detail herein, those skilled in the art can readily devise many other varied embodiments that still incorporate these teachings.

While the foregoing is directed to the preferred embodiment of the present invention, other and further embodiments of the invention may be devised without departing from the basic scope thereof, and the scope thereof is determined by the claims that follow.

What is claimed is:

1. A computer readable storage medium storing a software program that, when executed by a computer, causes the computer to perform a method comprising:
    opening an electronic mail message addressed to a recipient;
    opening a reply window in which to prepare a reply to a sender of the opened electronic mail message;
    in response to opening a reply window, determining whether one or more available electronic mail messages, also addressed to the recipient, are related to the open electronic mail message; and
    notifying the recipient of the open electronic mail message if any available electronic mail messages are determined as being related to the open electronic mail message.

2. The computer readable storage medium of claim 1, wherein the notifying step comprises:
    displaying a list of the available electronic mail messages determined as related to the open electronic mail message.

3. The computer readable storage medium of claim 1, wherein the determining step comprises:
    scanning all available electronic mail messages of the recipient of the open electronic message.

4. The computer readable storage medium of claim 1, wherein the available electronic mail message comprise at least one of an unopened electronic mail message, a previously opened electronic mail message, and an incoming electronic mail message.

5. The computer readable storage medium of claim 4, wherein the determining of previously read electronic mail messages is performed in substantially the same manner as the determining of unopened electronic mail messages.

6. The computer readable storage medium of claim 4, wherein the determining of incoming electronic mail messages is performed in substantially the same manner as the determining of previously read electronic mail messages.

7. The computer readable storage medium of claim 1, wherein the available electronic mail messages are related to the open electronic mail message if the available electronic mail messages have a substantially similar subject line as the open electronic mail message.

8. The computer readable storage medium of claim 1, wherein the available electronic mail messages are related to the open electronic mail message if the available electronic mail messages have a message identifier that is substantially similar to the message identifier of the open electronic mail message.

9. The computer readable storage medium of claim 8, wherein the message identifier is in a control message associated with the open electronic mail message and the available electronic mail message.

10. The computer readable storage medium of claim 8, wherein the message identifier comprises a user information field.

11. The computer readable storage medium of claim 8, wherein the message identifier comprises a time information field.

12. The computer readable storage medium of claim 1, wherein the available electronic mail messages are related to the open electronic mail message if the available electronic mail messages have a substantially similar message or text as the open electronic mail message.

13. The computer readable storage medium of claim 1, wherein the one or more available electronic mail messages is an incoming electronic mail message and wherein determining is performed in response to receiving the incoming electronic mail message.

14. A computer readable storage medium storing a software program that, when executed by a computer, causes the computer to perform a method comprising:
    opening the electronic mail message addressed to a recipient;
    on the basis of the open electronic mail message, and in response to opening a reply window in which to prepare a reply to a sender of the open electronic mail message, identifying one or more available electronic mail messages, also addressed to the recipient, as related to the open electronic mail message;
    displaying a list of the available electronic mail messages identified as related to the open electronic mail message, wherein the list excludes the open electronic mail message; and
    sending a response to a sender of the open electronic mail message, wherein the content of the response accounts for at least one of the available electronic mail messages determined to be related to the open electronic mail message.

* * * * *